May 14, 1935. F. G. WIKSTROM 2,001,442
MACHINE FOR AND METHOD OF MANUFACTURING BAG TUBES
Filed July 18, 1928 15 Sheets-Sheet 1
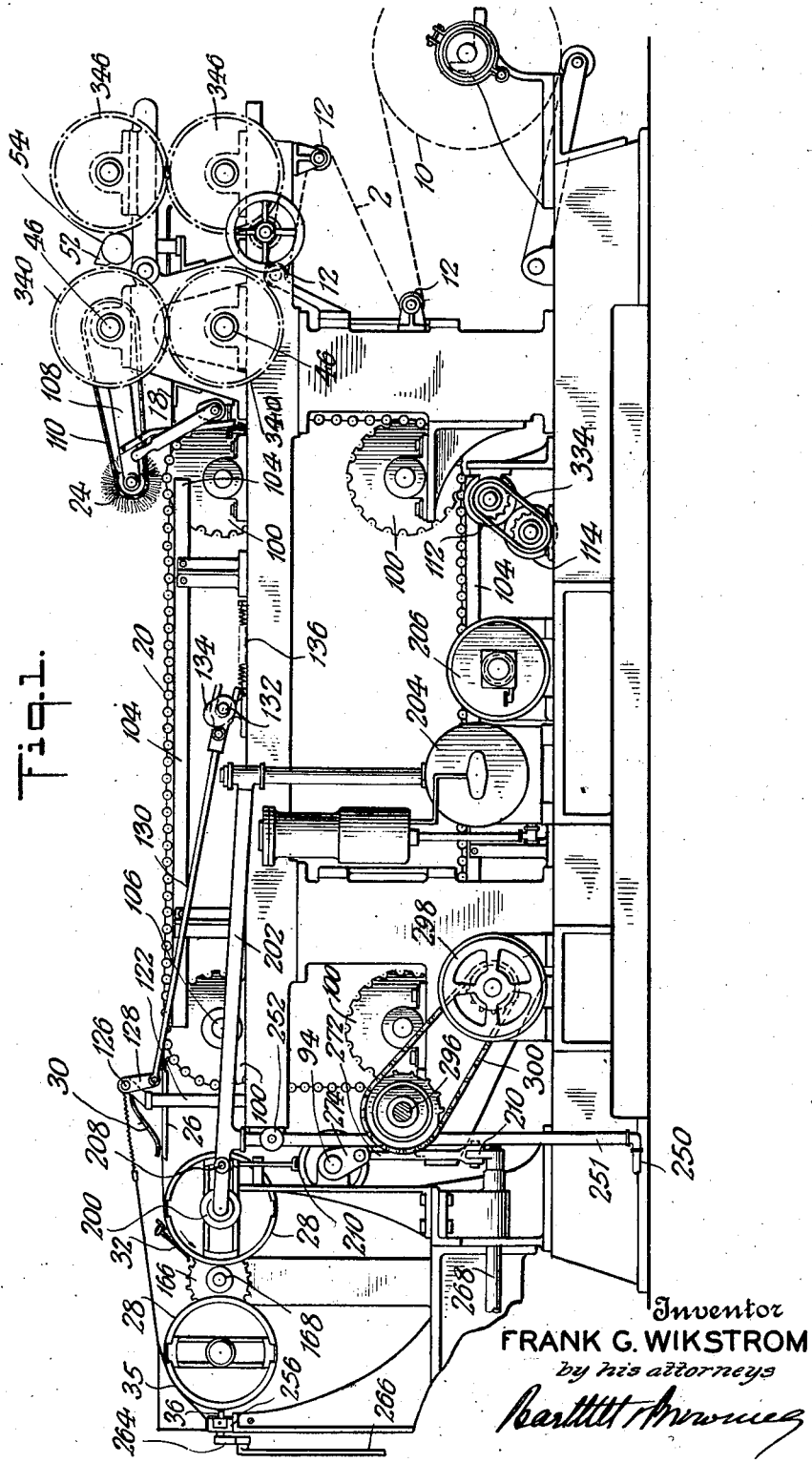
Inventor
FRANK G. WIKSTROM
by his attorneys

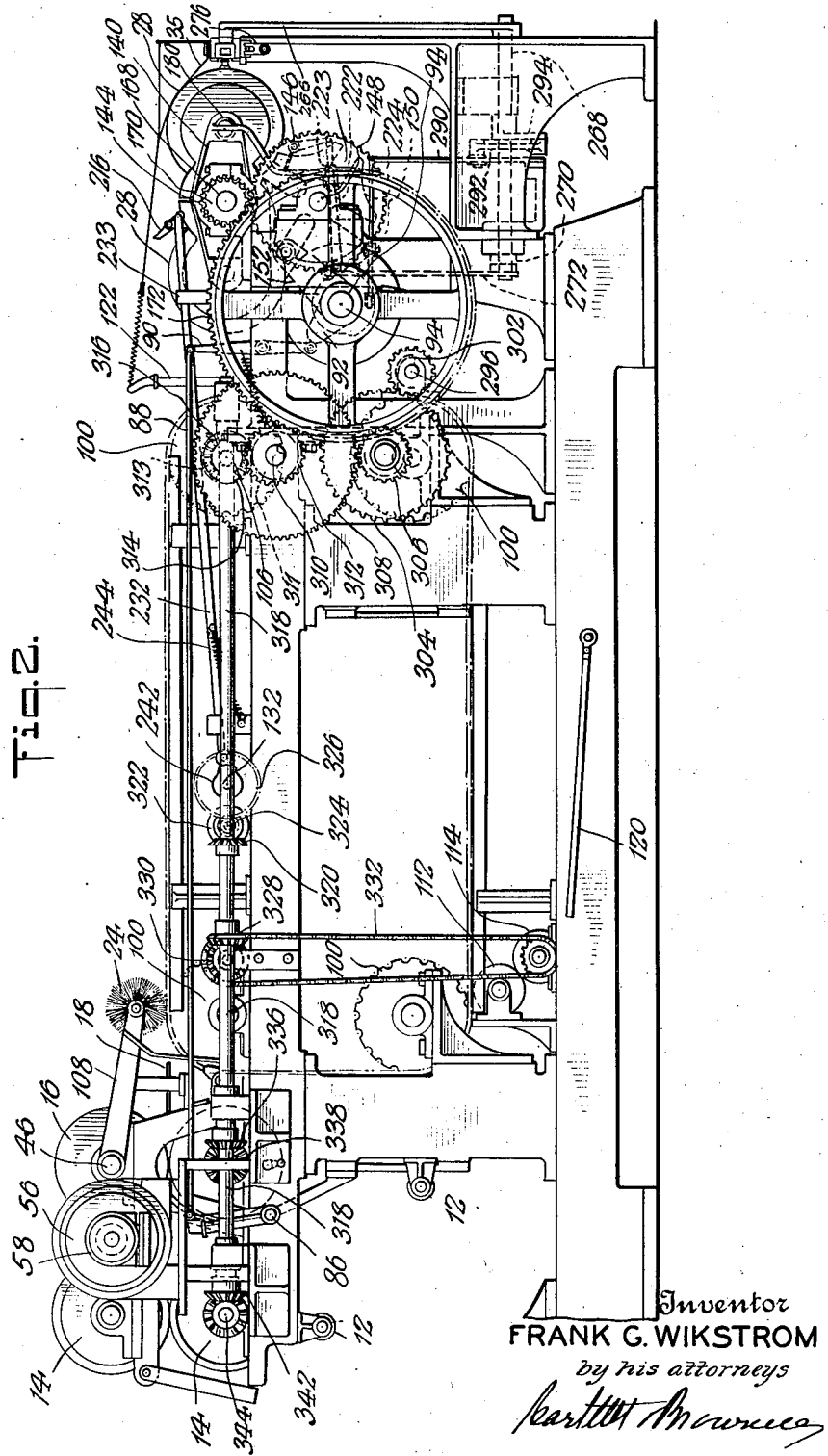

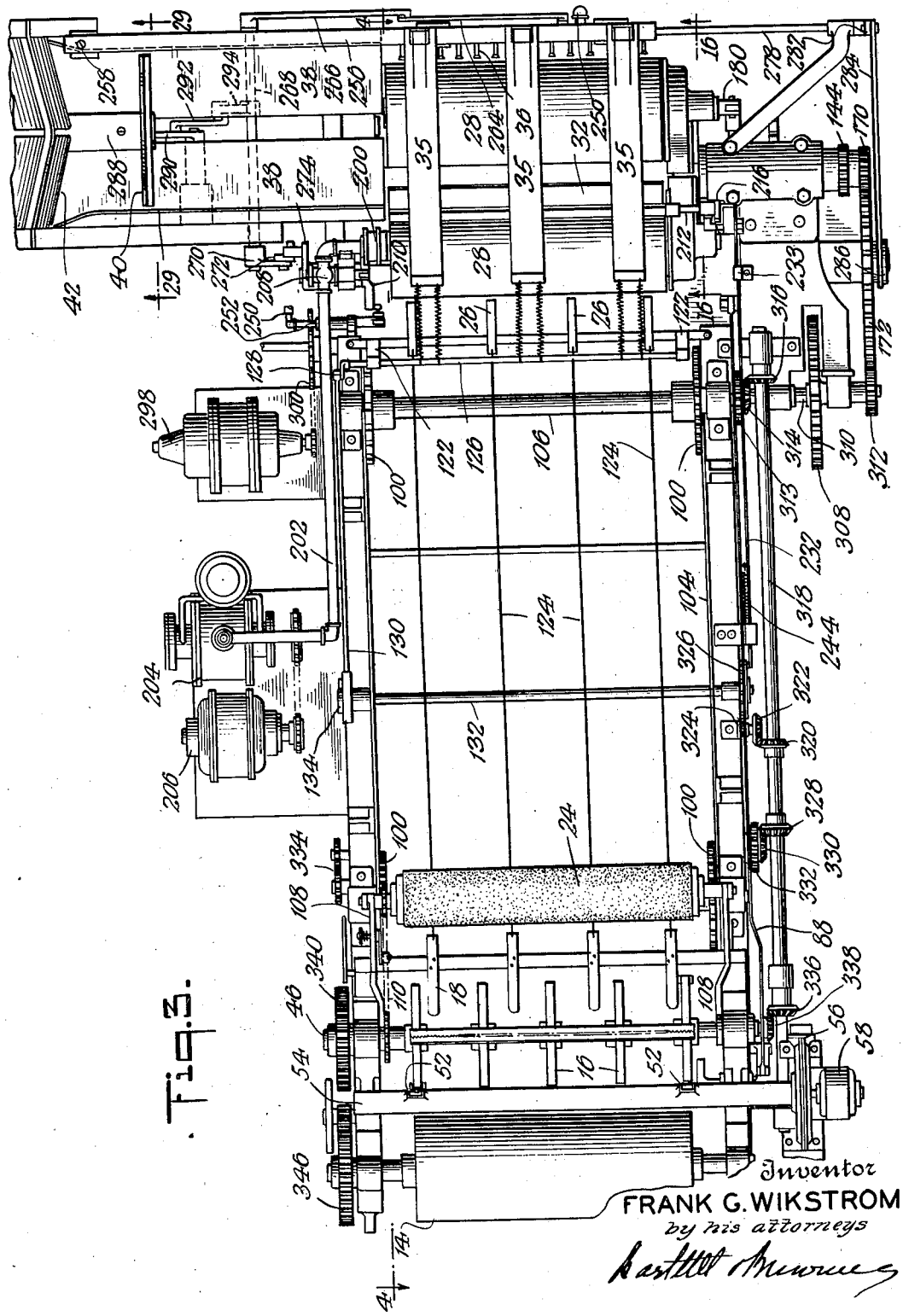

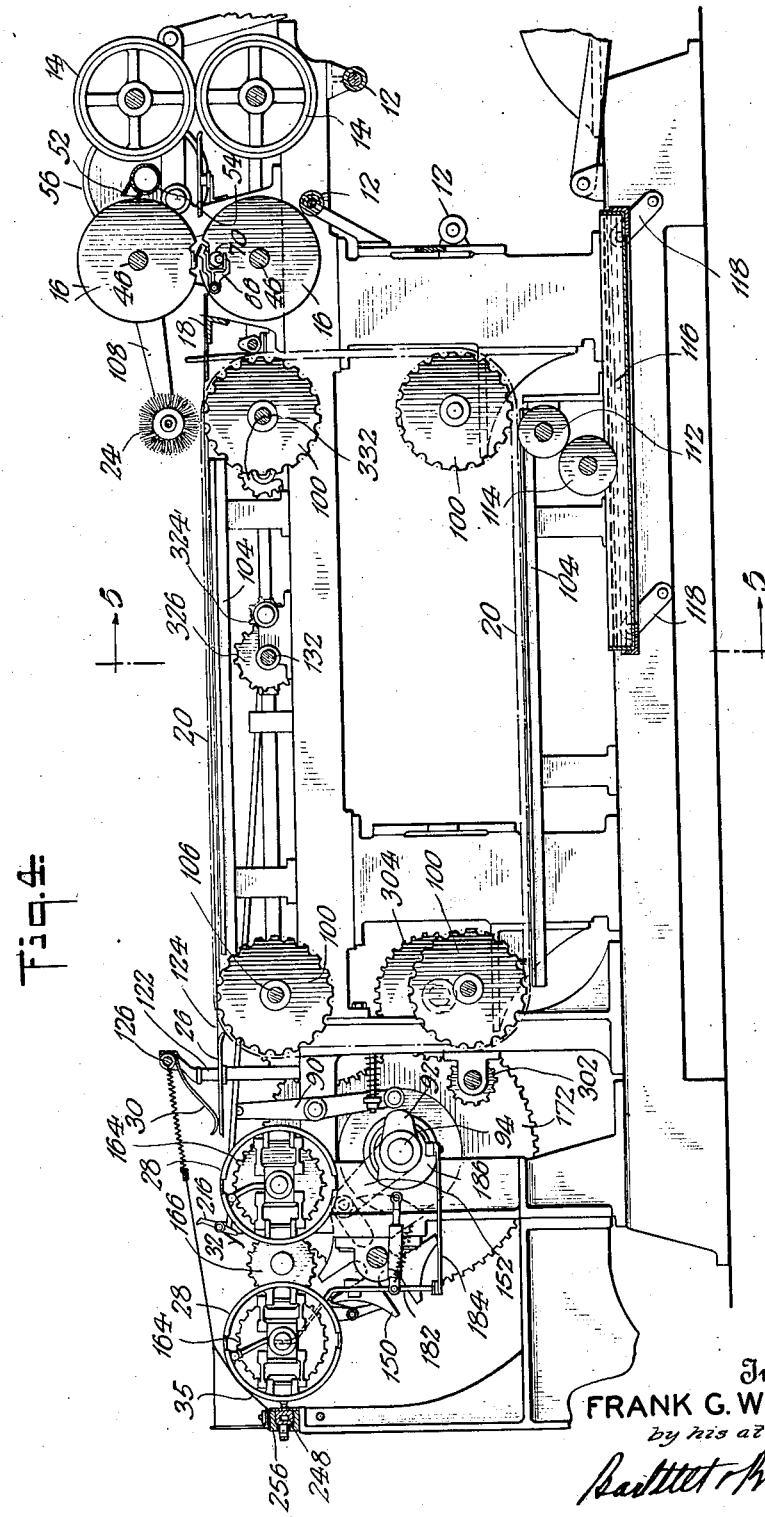

May 14, 1935.  F. G. WIKSTROM  2,001,442
MACHINE FOR AND METHOD OF MANUFACTURING BAG TUBES
Filed July 18, 1923  15 Sheets-Sheet 5
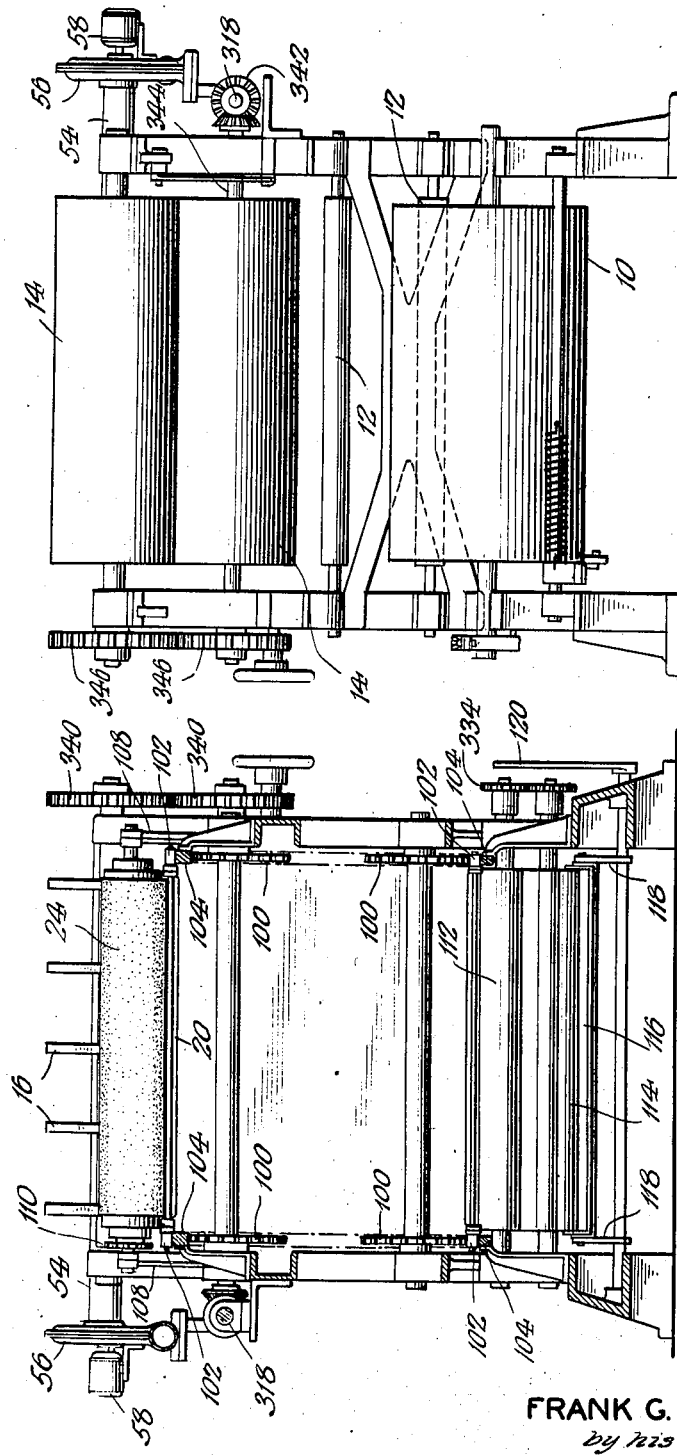
Inventor
FRANK G. WIKSTROM
by his attorneys

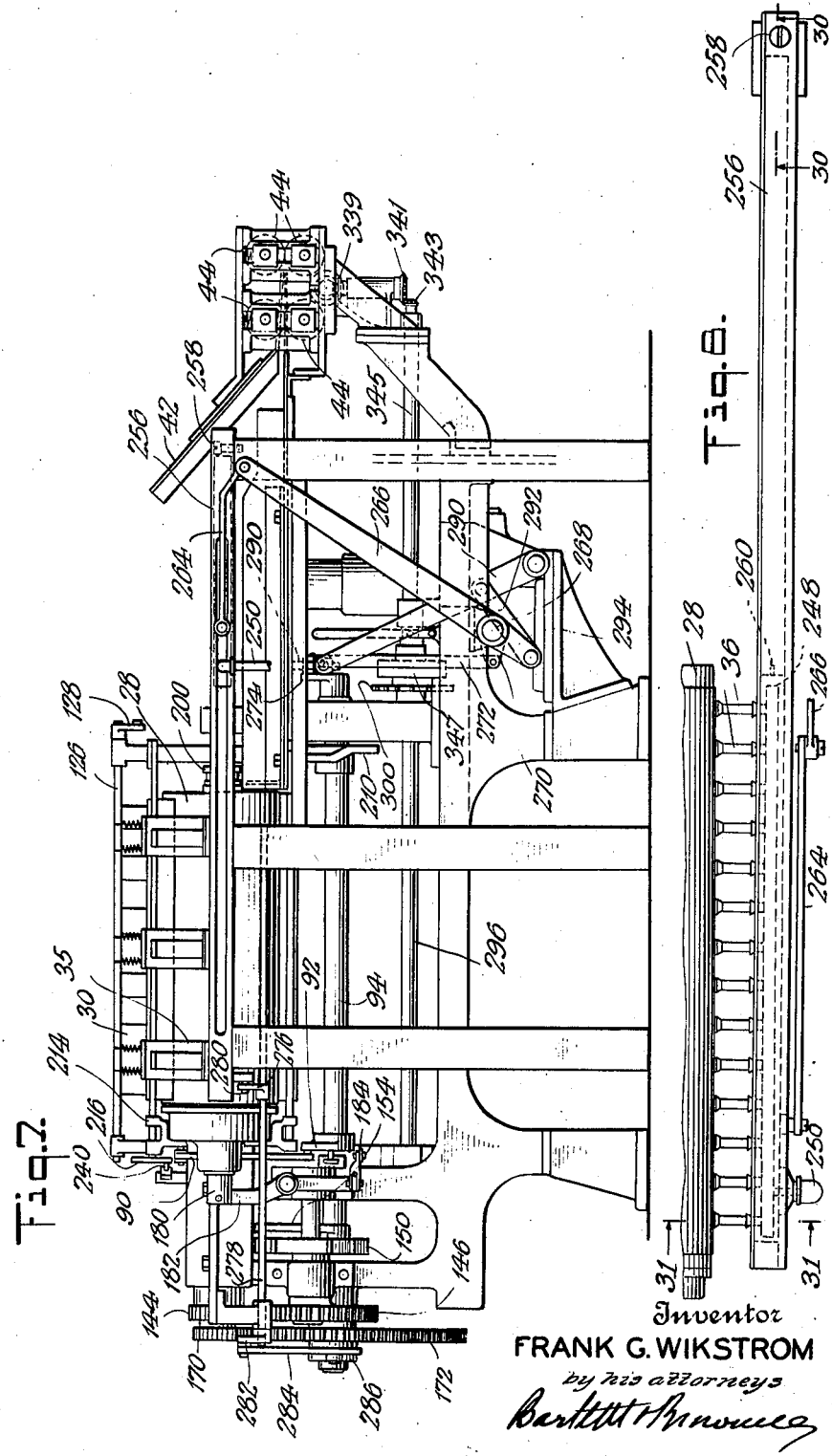

May 14, 1935. F. G. WIKSTROM 2,001,442
MACHINE FOR AND METHOD OF MANUFACTURING BAG TUBES
Filed July 18, 1928 15 Sheets-Sheet 7
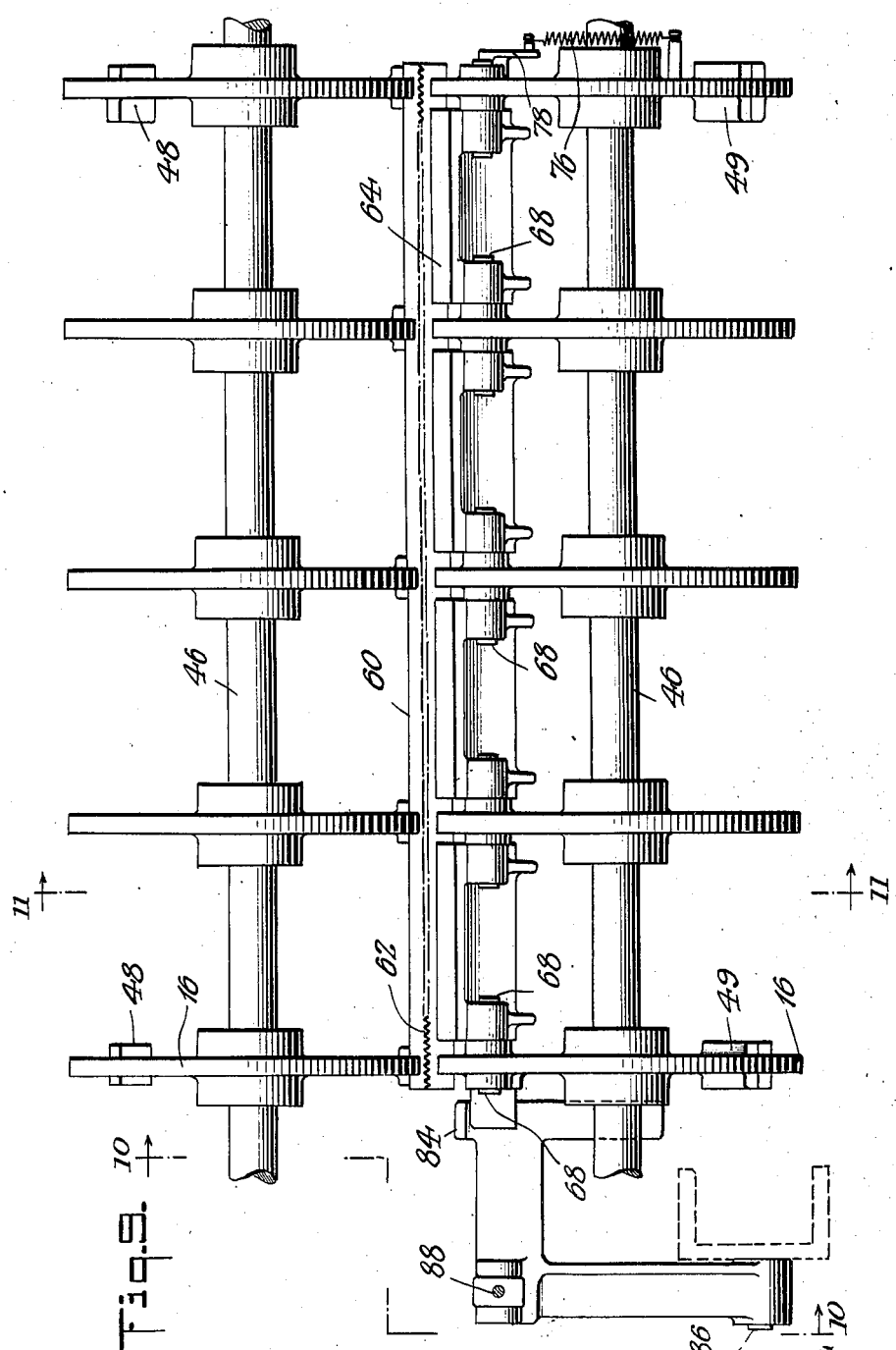
Inventor
FRANK G. WIKSTROM
by his attorneys

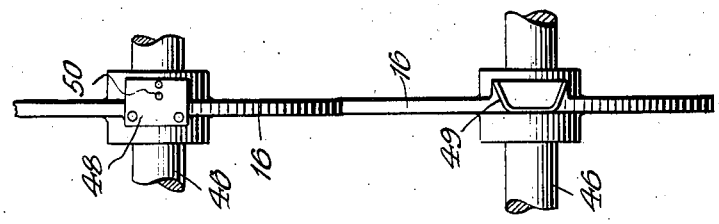
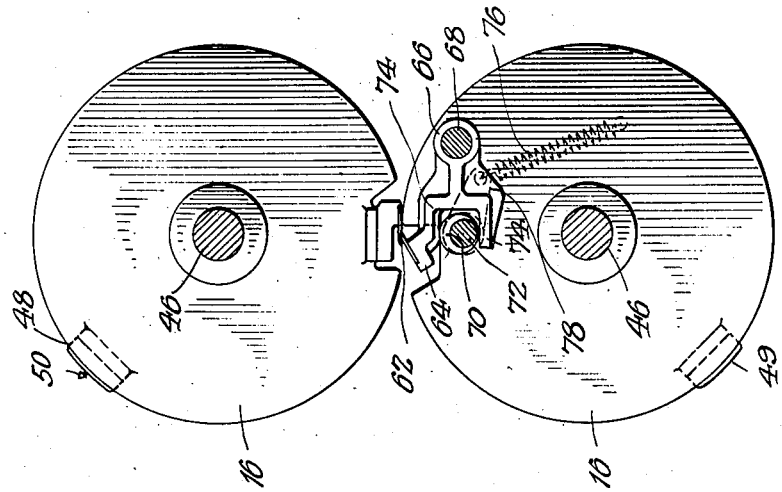
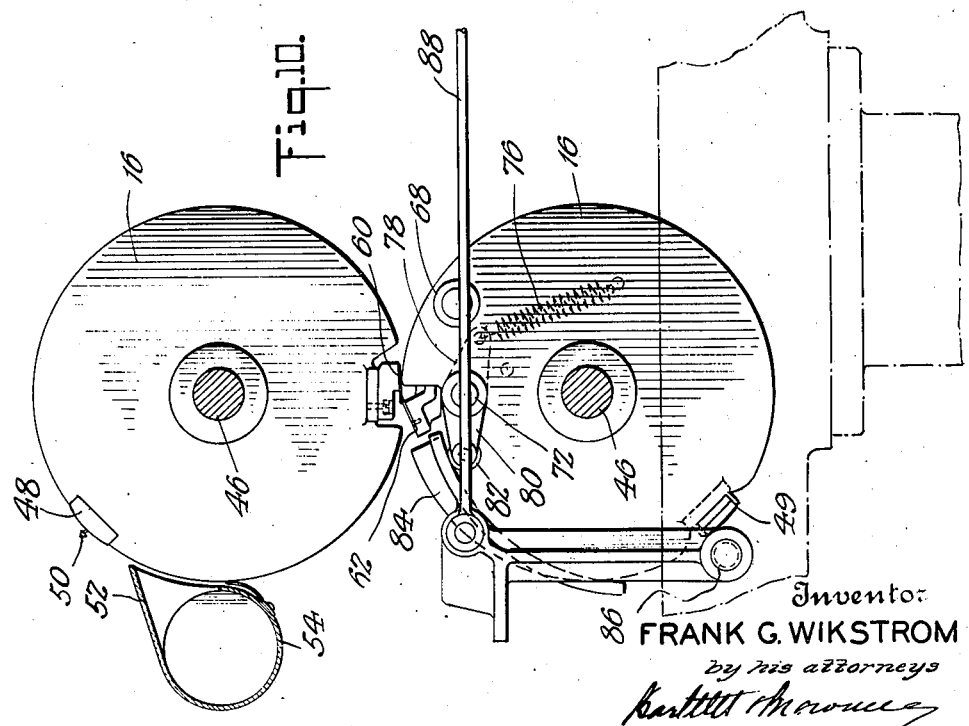

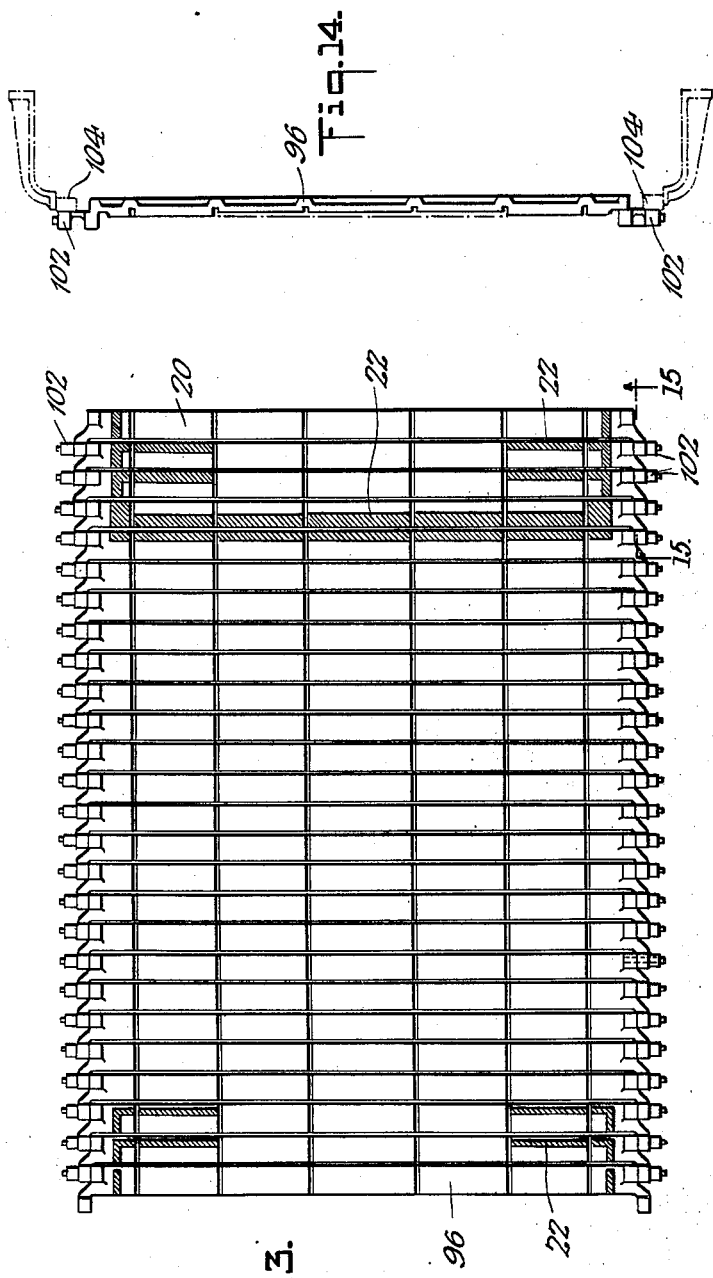
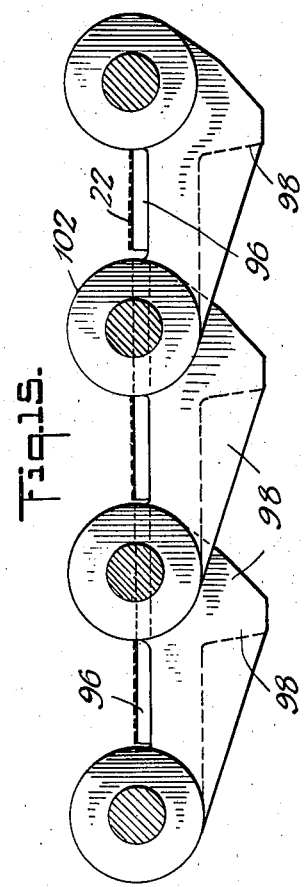

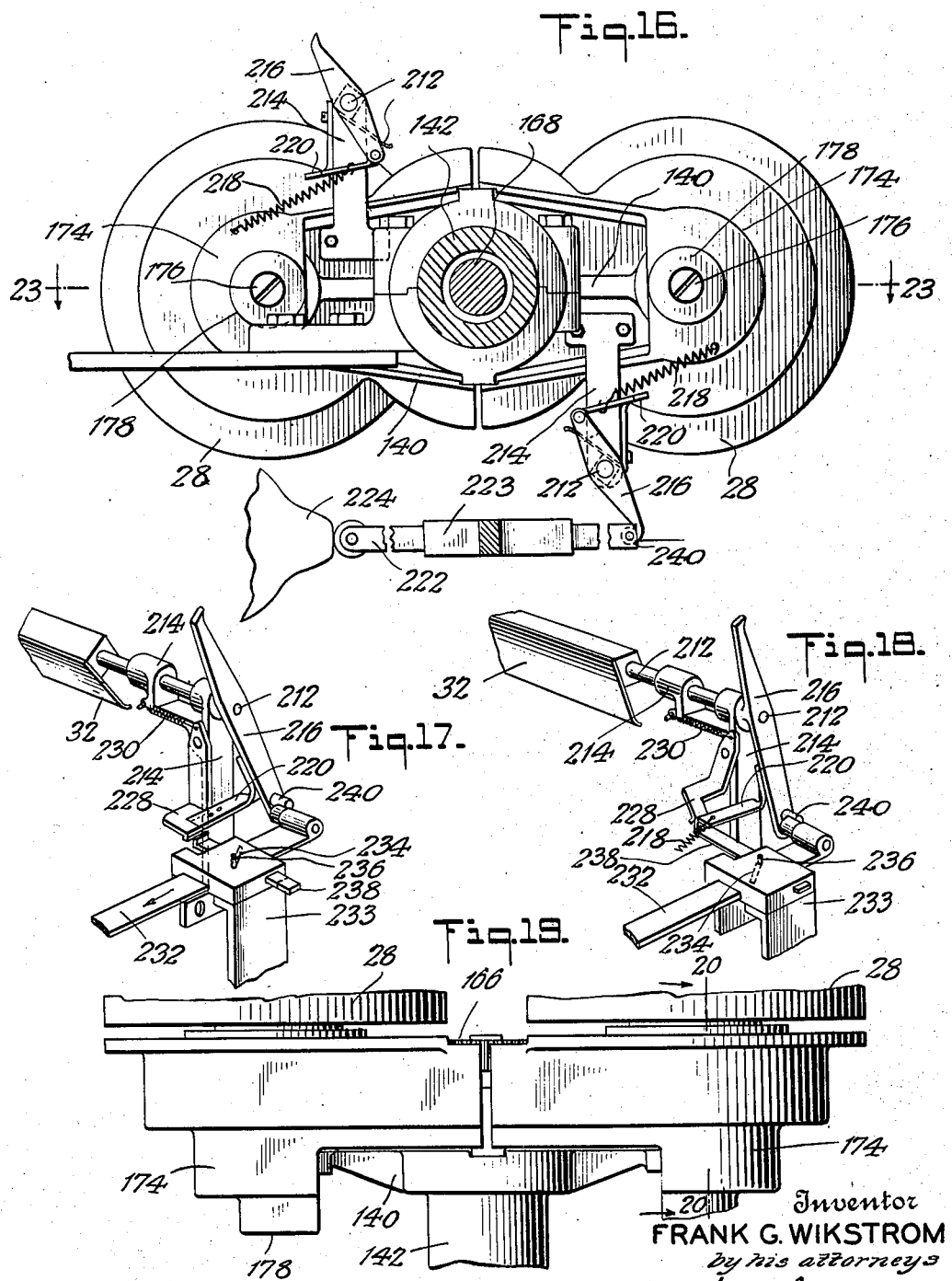

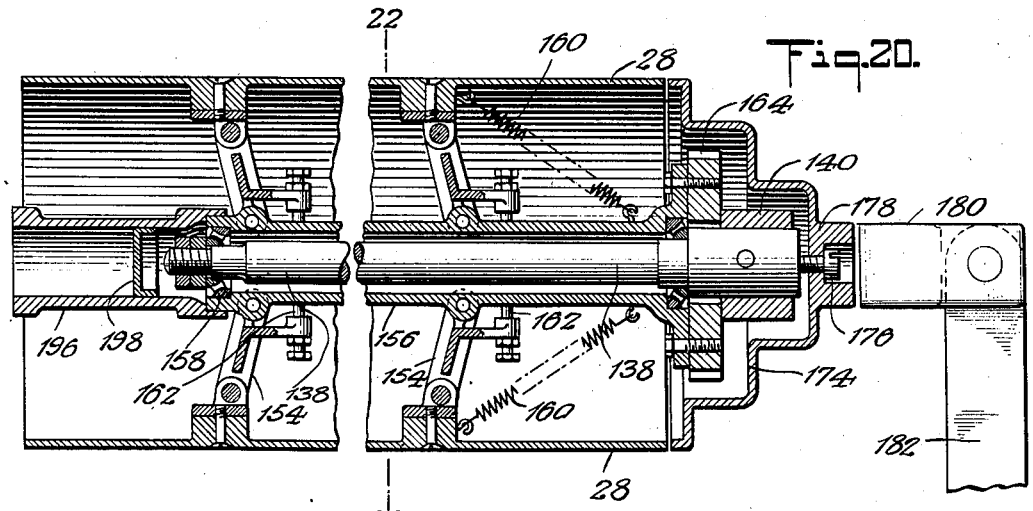
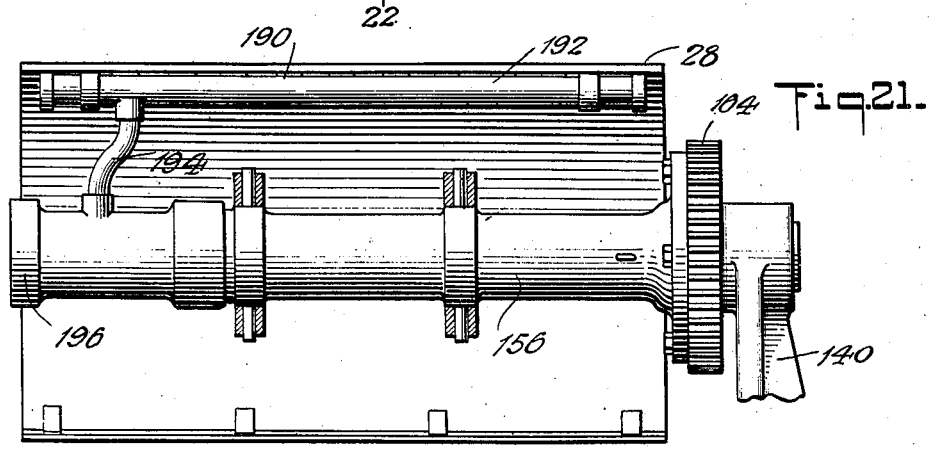
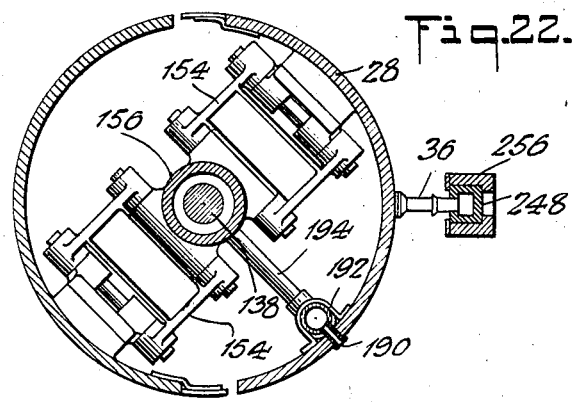

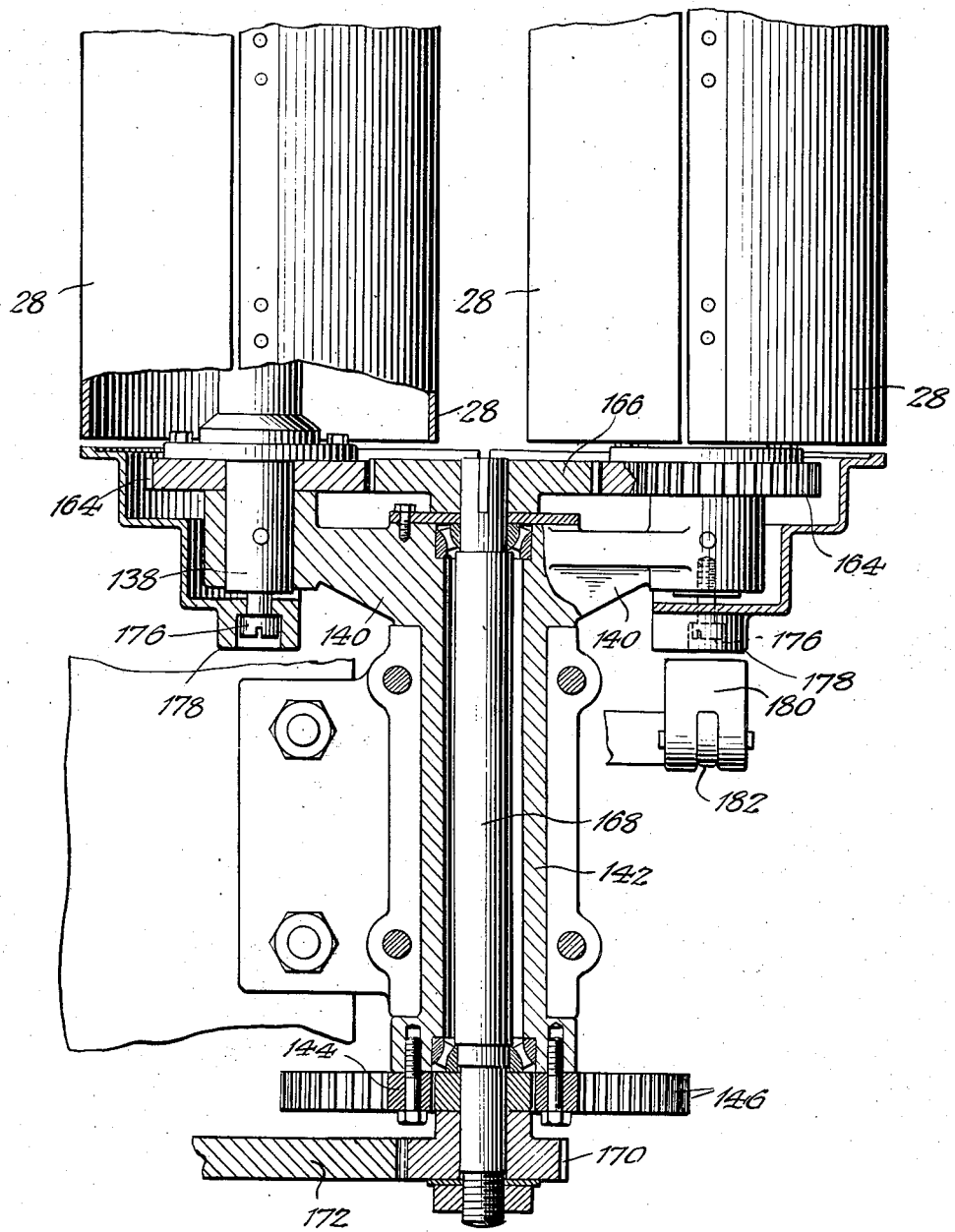

May 14, 1935.  F. G. WIKSTROM  2,001,442
MACHINE FOR AND METHOD OF MANUFACTURING BAG TUBES
Filed July 18, 1923  15 Sheets-Sheet 13
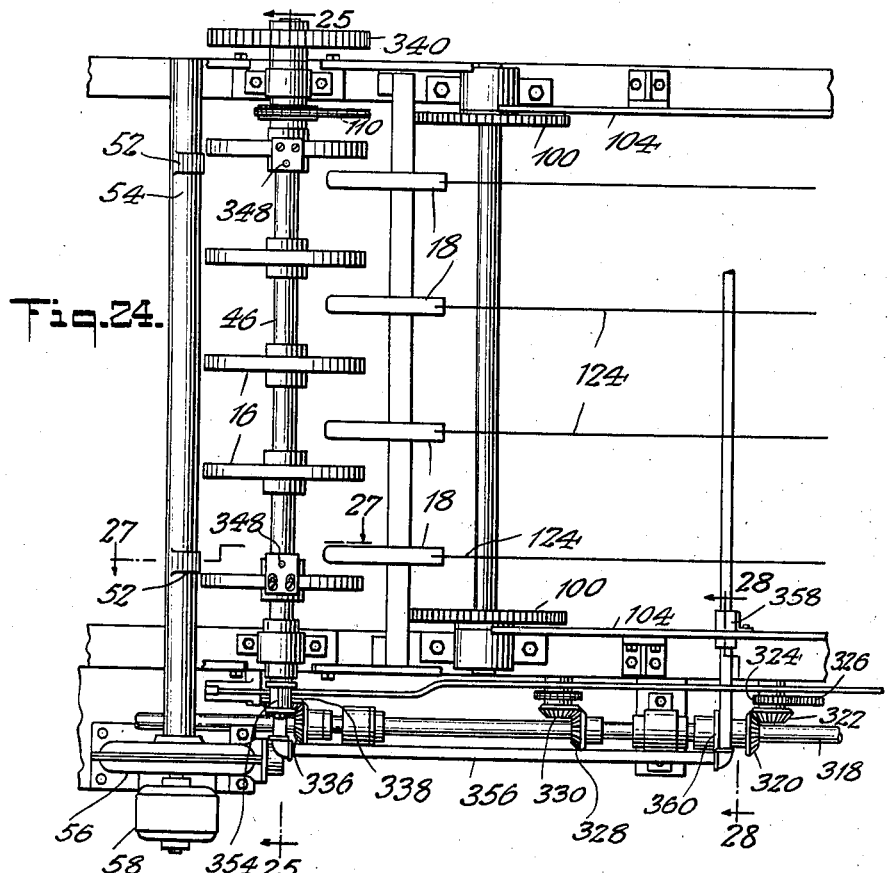
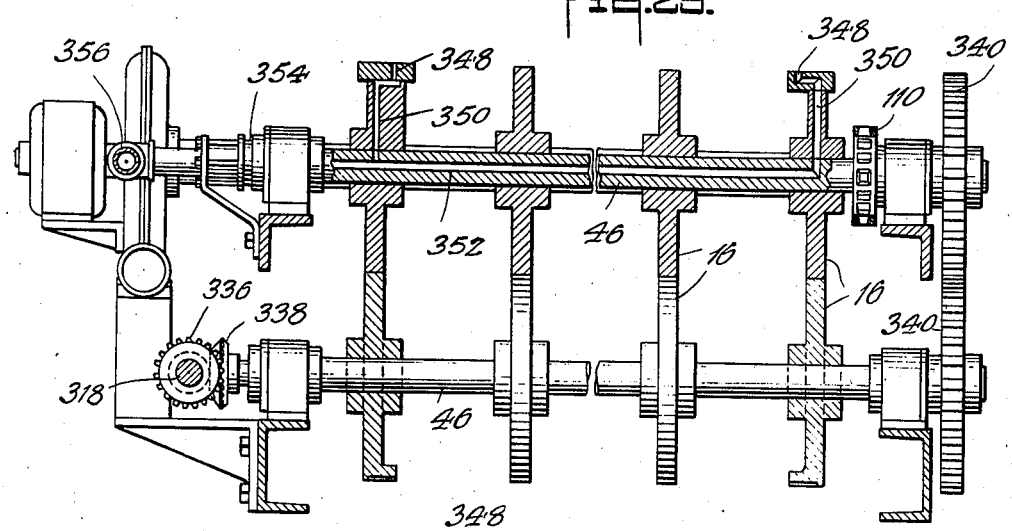
INVENTOR
FRANK G. WIKSTROM May 14, 1935.  F. G. WIKSTROM  2,001,442
MACHINE FOR AND METHOD OF MANUFACTURING BAG TUBES
Filed July 18, 1928  15 Sheets-Sheet 14

INVENTOR
FRANK G. WIKSTROM
by his attorneys

May 14, 1935.   F. G. WIKSTROM   2,001,442
MACHINE FOR AND METHOD OF MANUFACTURING BAG TUBES
Filed July 18, 1928    15 Sheets-Sheet 15
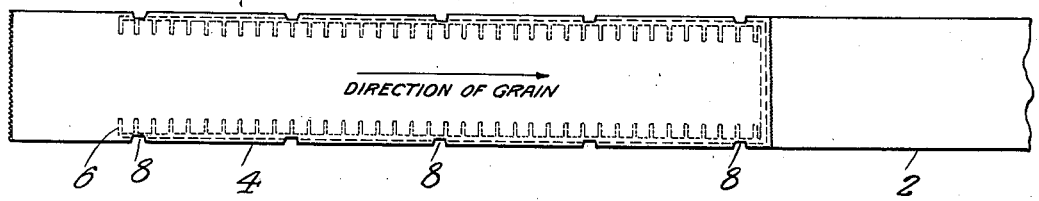
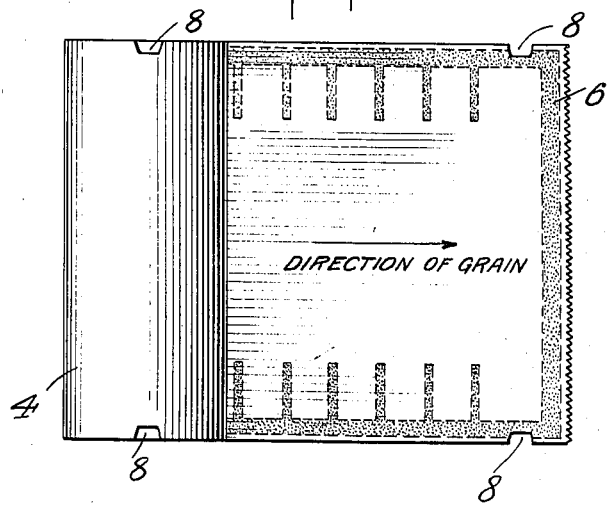
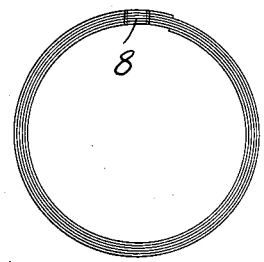
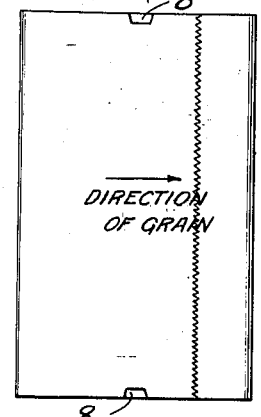
INVENTOR
FRANK G. WISTROM
by his attorneys Patented May 14, 1935

2,001,442

UNITED STATES PATENT OFFICE 2,001,442

MACHINE FOR AND METHOD OF MANUFACTURING BAG TUBES

Frank G. Wikstrom, Brooklyn, N. Y., assignor to Arkell & Smiths, Canajoharie, N. Y., a corporation of New York Application July 18, 1928, Serial No. 293,738

34 Claims. (Cl. 93—81)

My invention relates to machines for use in the manufacture of tubes for multi-ply bags, more particularly multi-ply bags for cement and other weighty substances, and further relates to a method of manufacturing such bag tubes.

One of the objects of my invention is to provide a novel and improved machine and method of this character.

Another object of the invention is to provide a machine for manufacturing bag tubes of the type that are formed by winding a web or strip upon itself a plurality of times so that when the material of the bag consists of paper the grain of the paper may extend generally transversely of the bag tube, such a bag tube and a method of forming the same being described and claimed in the pending application of Bartlett Arkell, Ser. No. 272,915, filed April 26, 1928.

A still further object of my invention is to provide a machine of the character indicated which is simple in construction and highly efficient in operation.

The several features of the invention, whereby the above mentioned and other objects may be attained, will be clearly understood from the following description and accompanying drawings, in which:

Figure 1 is a view of one side of my improved machine in its preferred form, certain parts of the machine being removed;

Fig. 2 is a view of the other side of the machine;

Fig. 3 is a plan view of the machine with certain parts removed;

Fig. 4 is a longitudinal sectional elevation taken substantially on the line 4—4 of Fig. 3;

Fig. 5 is a sectional view, partly in elevation, taken substantially on the line 5—5 of Fig. 4;

Fig. 6 is a rear end view of the machine;

Fig. 7 is a front end view of the machine;

Fig. 8 is a detail plan view of a portion of the machine illustrated in Fig. 7 but showing certain parts in a different position;

Fig. 9 is a detail front view of a portion of certain cutting devices of the machine;

Fig. 10 is a sectional elevation taken substantially on the line 10—10 of Fig. 9;

Fig. 11 is a detail sectional elevation taken on the line 11—11 of Fig. 9;

Fig. 12 is a detail front view of certain of the parts illustrated in Fig. 11, but showing those parts in a different position;

Fig. 13 is a detail plan view of a portion of an endless conveyor of the machine;

Fig. 14 is an end view of the portion of the conveyor illustrated in Fig. 13 and showing by broken lines supports therefor;

Fig. 15 is a detail sectional elevation, on an enlarged scale, taken on the line 15—15 of Fig. 13;

Fig. 16 is a detail sectional view, on an enlarged scale, taken substantially on the line 16—16 of Fig. 3;

Fig. 17 is a view in perspective of a paper smoothing device of the machine;

Fig. 18 is a similar view but showing certain parts in a different position;

Fig. 19 is a detail plan view, on an enlarged scale, of a portion of the machine illustrated in Fig. 16;

Fig. 20 is a detail sectional view, partly in elevation, taken substantially on the line 20—20 of Fig. 19;

Fig. 21 is a longitudinal sectional elevation of one section of one of the winding drums and associated parts of the machine;

Fig. 22 is a transverse sectional view taken substantially on the line 22—22 of Fig. 20;

Fig. 23 is a sectional plan view taken substantially on the line 23—23 of Fig. 16;

Fig. 24 is a detail plan view, on an enlarged scale, corresponding to a portion of Fig. 3, but showing a modified construction;

Fig. 25 is a sectional view, partly in elevation, taken on the line 25—25 of Fig. 24;

Fig. 26 is a detail plan view, on an enlarged scale, of a portion of one of the devices illustrated in Figs. 24 and 25;

Fig. 32 is a bottom plan view of a strip after being partly operated on by my improved machine in forming bag tubes;

Fig. 33 is a plan view of a web cut from the strip and partly wound upon itself a plurality of times;

Fig. 34 is an end view, on an enlarged scale, of a web completely wound; and

Fig. 35 is a plan view of a completed bag tube as formed by my improved machine and in accordance with my improved method.

Figures 27, 28:
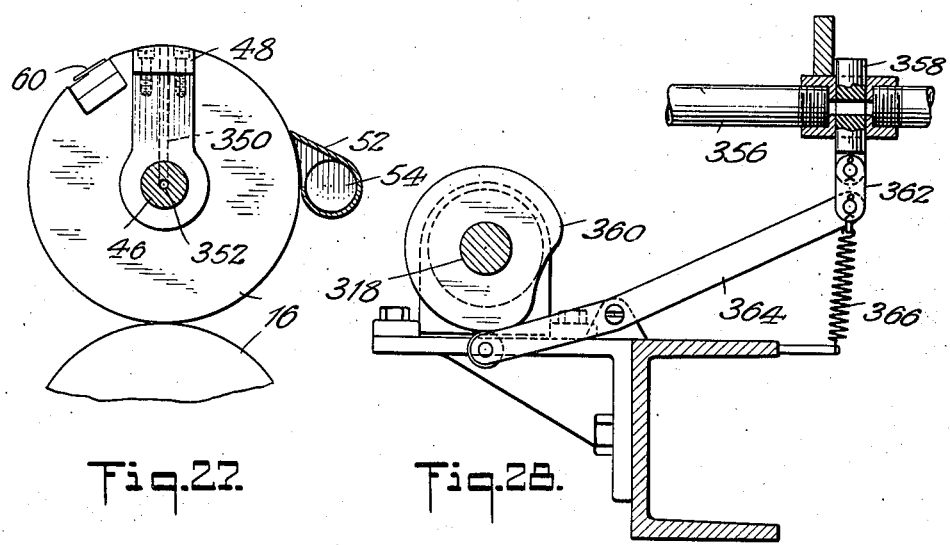
Fig. 27 is a detail sectional view taken on the line 27—27 of Fig. 24.
Fig. 28 is a detail sectional view, partly in elevation, taken on the line 28—28 of Fig. 24.

In accordance with my improved method of forming bag tubes, as illustrated in the drawings, a strip 2 (Fig. 32) from which the bag tubes are to be formed, is fed longitudinally and while being fed, is progressively cut transversely to form webs 4, and paste or glue 6 is applied adjacent the longitudinal edges and across the rear end of each web, the glue at the longitudinal edges of the web being spaced from the forward end thereof as this part of the web forms the inner side of the bag tube. Also, equally spaced notches 8 are cut in the longitudinal edges of the web previously to cutting off said web. The web is then wound upon itself a plurality of times to form a tube, the winding being such as to cause all of the notches in each longitudinal edge of the web to be accurately positioned in alinement or one over the other so as to provide a single notch in each end of one side of the tube (Fig. 34). The strip is tightly and smoothly wound so as to insure the windings being securely affixed together at the ends of the tube, the outer end of the strip securely affixed, and the materials of the windings being in intimate contact throughout. The tube thus formed is then flattened, as shown in Fig. 35, the flattening being effected in such a manner as to accurately center the notches at the ends of one side of the tube. When the completed tube has thus been formed, it is ready to be operated upon by the usual heading or ending machine, the notches providing clearance openings to permit the opposed side or wall of the tube to be gripped by the usual devices of the heading or ending machine during the operation thereof. The strip 2 is continuously fed and the sections or webs are successively cut off and operated upon to form the bag tubes so that the method may be performed continuously.

In the machine illustrated in the drawings, the strip 2 is drawn from a supply roll 10 which is suitably supported at the rear end of the machine frame, over suitably arranged guide rolls 12, between feed rolls 14, between upper and lower disks 16, over supporting fingers 18 and upon an endless conveyor 20. As the strip passes between the disks 16 suitable devices act to cut the notches 8 in the strip, and after a sufficient length of the strip has been fed between the disks to form a bag tube, devices carried by the disks act to cut off said length or web. The endless conveyor 20 is provided with raised portions 22 (Fig. 13) to which glue is applied, by means hereinafter described, so that as the web is carried along by the conveyor, glue is applied to its under side along its longitudinal edges and across its rear end, as above described. A rotating brush 24 engages the top surface of the web as it passes to the conveyor 20 so as to insure proper contact thereof with the raised glue applying portions 22 of the conveyor. The web is carried over a horizontal stretch of the conveyor and is stripped therefrom as it reaches the forward end thereof by means of suitable stripping fingers 26 horizontally arranged. As the forward end of the strip leaves the fingers 26, it passes to one of a pair of rotating winding mandrels or drums 28 which has been moved into position to receive it, and suitable suction means is provided, hereinafter described, for securing the end of the web to the drum so as to cause it to be wound on the drum during the continued rotation thereof. After the start of the winding of the web on the drum, a spring tension plate 30 is swung down into engagement with the web to cooperate with the fingers 26 to place the required degree of tension on the web to insure it being tightly wound on the drum. Also, after the web has been wound partly around the drum, a smoothing device, comprising a spring pressed plate 32, presses the web against the periphery of the drum so as to insure smooth and uniform winding of the strip. After the web has been wound substantially three times about the drum, the drum while still rotating is bodily carried with its smoothing device 32 in a counter-clockwise direction, viewing Fig. 1, through an arc of substantially 180 degrees, which pulls the remaining portion of the web from the conveyor 20 and the winding of the web is completed as the drum reaches its retracted position. Each winding drum 28 is normally driven at the same surface speed as the conveyor, but as the drum with the partially wound web thereon is carried forwardly, the rotation of the drum is speeded up which together with said bodily movement of the drum causes the unwound end portion of the web to be pulled lengthwise from the conveyor with sufficient rapidity as to separate said end of the winding web a substantial distance from the end of the supply strip 2. Such separation of the winding web allows sufficient time to permit the other winding drum to be moved into position to receive the next web that is cut off from the supply strip. Previously to the presenting of the next web to the winding drum the tension plate 30 is raised so as to permit the end of the web to be fed beneath it to the winding drum.

In order to prevent the unwound end of the web from being thrown outwardly by centrifugal force as the drum is carried forwardly, and to assist the smoothing device 32 in properly holding said end down on the drum, a plurality of spring tensioned straps 35 extend over the two drums with their forward ends secured at the front end of the machine below the top surfaces of the drums when in normal position, and with their rear ends secured a distance at the rear of the drums and above the top surfaces thereof. The drums are made in collapsible sections and when a web has been completely wound on one of the drums, suitable devices act to collapse the drum slightly, and means comprising suction nozzles 36 engage the wound web tube and slide it from the drum and deposit it upon a table 38. When the tube is thus deposited on the table 38, a pusher 40 engages the rear end of the tube, and pushes the tube beneath a suitably inclined plate 42 and between rollers 44 which flattens the tube and discharges it from the machine. The operating parts of the machine are so timed as to ensure the notches in one side of the ends of the flattened tube being accurately centered.

The disks 16, above referred to, are carried by shafts 46 journaled in suitable brackets on the machine frame (Figs. 9, 10 and 11). The end disks 16 carry the devices for cutting the notches in the webs, these devices comprising male and female dies 48 and 49 secured on the upper and lower disks, respectively. The dies 48 and 49 act to cut opposed notches in the longitudinal edges of the web during each complete rotation of the disk. As a notch is cut in the web the piece cut out is pierced by a pin 50 secured on each of the cutting members 48, and before the cutting members again act on the web the waste piece is removed from the pin 50 and conveyed from the machine through a suction nozzle 52 leading into a pipe 54 which has one end connected with a suction fan 56 that is driven by a motor 58 (Figs. 2 and 3).

The devices for cutting off the webs 4 comprise a blade 60 which is carried by the upper series of disks 16, and a blade 62 which is carried by the lower series of disks 16. The lower blade 62 is secured on a bar 64 which has forwardly projecting arms 66 arranged adjacent the sides of the lower disks 16, and pivotally mounted on pins 68 that are secured in the disks, respectively. At the completion of five complete revolutions of the disks 16, the blade carrying bar 64 is swung upwardly about the pivot pins 68 so as to cause the blade 62 to cooperate with the blade 60 to cut off a web, the blade carrying bar 64 being at all other times held in retracted position.

The blade carrying bar 64 is actuated by means of cams 70 that are secured on a rock shaft 72 and are received in bifurcated portions 74 of the arms 66, the rock shaft 72 being mounted in apertures in the lower series of disks 16. The rock shaft is turned in a direction to cause the cams 70 to swing the lower blade 62 into retracted position and to maintain it in retracted position, by means of a coiled spring 76 having one end connected with one of the outermost disks of the lower series and its other end secured to an arm 78 secured on the corresponding end of the rock shaft 72. The rock shaft is turned in the opposite direction to cause the lower blade 62 to cooperate with the blade 60 to cut off a web at the completion of five complete revolutions of the disks 16 by cam actuated means. This means comprises an arm 80, secured on one end of the rock shaft 72 which carries a cam roll 82 adapted to be engaged by a curved cam plate 84 that has its lower end pivotally mounted on a pin 86 secured on the machine frame. The cam plate is swung inwardly so as to engage the cam roll 82 to turn the shaft 72 in a direction to swing the cutting blade 62 upwardly, by means of a link or rod 88 having one end pivotally connected with the upper end of the cam plate and its other end pivotally connected with a cam lever 90 (Fig. 2) which is pivoted on the machine frame and has its other end provided with a cam roll that is adapted to be engaged by a cam 92 carried by the main cam shaft 94 of the machine.

The endless conveyor 20 which receives the bag lengths or webs 4 after they leave the supporting fingers 18, is made up of a plurality of transverse bars or slats 96 (Figs. 13, 14 and 15) which are suitably pivotally connected at their ends, and each is provided with a depending tooth 98 for engagement with the teeth of four sprocket wheels 100 adjacent each edge of the conveyor. The ends of the slats 96 are provided with rollers 102 which ride on supporting tracks 104 for the upper and lower stretches of the conveyor. The conveyor is driven by means of a shaft 106 which carries two of the sprocket wheels 100.

The brush 24 under which the paper passes as it is delivered to the conveyor 20, is supported on the ends of arms 108 that are pivotally mounted on the shaft 46 that carries the upper cutting disks 16. The brush is driven by means of a sprocket chain 110 which passes over a sprocket wheel secured to the brush shaft and a sprocket wheel secured to said upper shaft 46 (Figs. 1 and 2).

The means for applying glue to the raised portions 22 of the conveyor 20, comprises a glue-applying roll 112 which extends across the rear end of the lower stretch of the conveyor, and is rotated in contact with a roll 114 which is partially immersed in a pan of glue 116. This pan of glue 116 is supported by links 118 which are adapted to be turned to raise and lower the pan by means of a hand lever 120 (Fig. 2) secured to one of the rods that supports the lower ends of the forward links 118.

The fingers 26 for stripping the webs from the conveyor 20, as above described, are mounted on a cross-bar that has its ends secured to upstanding bracket members 122. Wires 124 have their forward ends secured to these stripping fingers and their rear ends secured to the supporting fingers 18, and the portions of the wires between said two sets of fingers extend through clearance grooves in the transverse bars or slats of the conveyor. These wires 124 assist the stripping fingers 26 to uniformly strip the bag lengths from the conveyor 20.

The tension plate 30 for cooperating with the stripping fingers 26 to place the required degree of tension on the webs as they are wound on the winding mandrels or drums, as above described, has its rear edge secured on a rock-shaft 126 having its ends mounted in the bracket members 122. The rock-shaft is turned so as to move the tension plate into and out of engagement with the webs by means of an arm 128 secured to one end of the shaft 126. The free end of this arm 128 is connected with one end of a rod 130 (Figs. 1 and 3), the other end of which is bifurcated to straddle a shaft 132, suitably mounted on the machine frame, that carries a cam 134 which engages a cam roll on the rod 130, the cam roll being held in engagement with the cam, and the tension plate 30 being pressed toward the webs by means of a coiled spring 136 having one end connected with the rod 130 and its other end secured to the machine frame.

The winding drums 28 (Figs. 16 to 23) are mounted to turn on stud shafts 138 that have corresponding ends secured in apertures in the outer ends of arms 140 projecting radially from the inner end of a carrier or turret 142 which is mounted to turn in a suitable bearing block on the machine frame. The turret is turned intermittently in a counter-clockwise direction (viewing Fig. 2) so as to reverse the position of the winding drums as above described, by means of a gear 144 secured on the outer end thereof which is engaged by a gear 146 secured on a shaft 148. A slotted disk 150 of a Geneva mechanism is also secured on the shaft 148, and the driving member thereof comprises a stud that is carried by an arm 152 secured on the cam shaft 94.

Each winding drum 28 comprises a cylindrical shell which is longitudinally divided into two sections that are movable toward and from each other to vary the peripheral length of the drum. Each shell section is pivotally mounted on the outer ends of toggle links 154 which have their inner ends pivotally mounted on a hub sleeve 156 that is mounted to turn on the associated stud shaft 138, roller bearings 158 being interposed between the sleeve and the stud shaft. Each section of the cylindrical shell of the drum is yieldingly held in expanded position by means of a coiled spring 160 having one end secured to the inner side of the shell section and its other end secured to the hub sleeve 156, the outward movement of the shell section being limited by the engagement of an adjustable abutment screw 162 on each toggle link 154 with the hub sleeve 156. The winding drums are both driven in a clockwise direction (viewing Fig. 2) by means of gears 164, secured on the outer ends of the hub sleeves 156, which are engaged by a gear 166 secured on the inner end of a shaft 168 that extends through an axial bore in the turret 142 and is arranged to rotate on suitably arranged roller bearings. A pinion 170 is secured on the outer end of the shaft 168 and is engaged by a gear 172 which is carried by the cam shaft 94.

The shell sections of each winding drum are adapted to be moved inwardly or collapsed when the drum is in its forward position and the wound tube is to be removed therefrom, by means of a cap 174 which is suitably supported and guided on the inner portion of the turret 142 and by means of a screw 176 which extends loosely through an aperture in the cap and is screw-threaded into the outer end of the associated stud shaft 138, there being a cap 174 for each drum. Each cap is provided with a centrally located outwardly projecting boss 178 which is adapted to be struck by a hammer 180 mounted on the upper end of a lever 182 (Fig. 7) which is centrally pivoted on the machine frame and has its lower end pivotally connected with one end of a cam lever 184. The other end of the cam lever 184 is provided with a cam roll that is engaged by a cam on the cam shaft 94. When each cap 174 is struck by the hammer 180, the inner edge of the cap by engagement with the outer edge of the shell sections, forces the sections to be swung inwardly about the pivots of the toggle links 54 and against the tension of the coiled springs 160 so as to collapse or reduce the diameter of the winding drum, and thus permit the bag tube to be easily removed. When the bag tube has been removed the springs 160 return the drum sections to their expanded positions.

The suction means above referred to for securing the advancing end of each bag length to the winding drum as the bag length is initially presented to the drum, comprises a series of nozzles 190 which extend through apertures in one of the shell sections of the winding drum and are arranged substantially the length of the drum. These nozzles lead from a pipe 192 which through a branch pipe 194 is in communication with a pipe 196 that is secured on the end of the trunnion sleeve 156 of the drum. A plug 198 is secured in the inner end of the pipe 196 so as to close said end.

When the winding drum is carried by its turret into position to receive one of the bag lengths, the end of the pipe 196 is positioned in axial alinement and in air tight abutting engagement with a coupling nozzle 200 (Figs. 1 and 3) which is in communication through a pipe 202 with a suction pump 204 driven by a motor 206, through a sprocket chain 207 that passes over sprocket wheels on the shafts of the pump and motor. Communication through the vacuum pipe 202 is controlled by means of a valve 208 which is operated through suitable connection with a cam 210 on the main cam shaft 94. With this construction, as the end of a web is presented in position over the nozzles 190 of the winding drum, the valve 208 is opened so as to cause the nozzles by suction to hold the end of the web to the drum. After the web has been wound a plurality of times about the drum and immediately before the drum is shifted to its forward position by means of its turret, the valve 208 is closed so as to cut off communication between the holding nozzles 190 and the vacuum creating means.

The plates 32 which are associated with the winding drums to assist in smoothly and tightly winding the webs on the drums, are each secured on a shaft 212 (Figs. 16, 17 and 18) which has one of its ends mounted to turn in suitable bearings in a bracket 214 secured to the associated arm of the drum turret 142. A lever 216 is secured on the end of the shaft 212, and the plate 32 is held in yielding engagement with the winding web by means of a coiled spring 218 connected with an abutment member 220 secured to the lever 216. When the web has been completely wound on one of the drums and the drum is about to be collapsed previously to the removal of the tube from the drum, the smoothing plate 32 is lifted by means of a rod 222 which engages one end of the lever 216. This rod 222 is mounted to slide in a bearing 223 in the machine frame and its other end carries a cam roll which engages a cam 224 carried by the cam shaft 94. When the smoothing plate 32 is thus raised it is held in raised position, as the drum is carried by its turret to a position to receive the next tube web, by means of a latch-lever 228 which snaps into holding engagement with the end of the abutment arm 220, the latch-lever being swung into latching position by means of a coiled spring 230 connected with one end thereof. When the end of the next tube web is wound substantially two-thirds around the winding drum, the latch 228 is released so as to permit the smoothing plate 32 to be carried by its spring down into engagement with the web. To provide for this, a rod 232 is mounted to slide in a bracket 233 on a stationary part of the machine frame. This rod is provided with an inclined guide slot 234 through which extends a pin 236 carried by a sliding bolt 238 mounted to slide in an aperture in the upper end of the bracket 233 transversely of the rod 232. To disengage the latch 228, the rod 232 is shifted in the direction of the arrow shown in Fig. 17 which, through the pin and inclined slot connection with the bolt 238, projects the bolt so as to cause its end to engage the adjacent portion of the end of the latch lever 228 and thus retract the latch lever out of engagement with the abutment arm 220, permitting the spring 218 to swing the smoothing plate down in engagement with the winding web. In order to prevent too sudden engagement of the plate 32 with the web upon releasing the latch 228, a stud 240 on the end of the lever 216 engages a laterally projecting stud on the end of the rod 232 so that the smoothing plate 32 can only swing down as the rod 232 is moved, the movement of the rod being relatively slow. The rod 232 is thus moved by means of a cam 242 which engages a cam roll on the end of the rod, the cam roll being held in engagement with the cam by means of a spring 244 connected with the rod.

The suction nozzles 36 (Figs. 1, 3, 7, 8 and 31) for removing the wound web from its drum, are carried by a slide 248 which is cored out to provide a vacuum chamber that is in communication, through a flexible hose 250, with a pipe 251 leading from the pipe 202 that leads from the vacuum pump 204 as above described. The pipe 251 is provided with a valve 252 which is adapted to be opened and closed through suitable connection with the cam 210, so as to open and close communication between the vacuum chamber and the pump 204 in proper timed relation as presently described. The slide 248 is mounted in a suitable guideway in a bar 256 that is pivotally mounted at one end on a screw 258. When a bag tube is to be removed from its drum, the slide 248 is moved to a position to bring the nozzles 36 opposite the bag tube. Then the bar 256 is swung inwardly to move the nozzles into airtight engagement with the bag tube, whereupon the valve 252 is opened to open communication with the vacuum pump 204. The slide 248 is then advanced so as to cause the nozzles 36 by suctional engagement with the bag tube to draw the bag from the drum. When the bag tube has been completely removed from the drum and positioned over the table 38 the valve 252 is closed and air is admitted to the vacuum chamber so as to release the bag tube to permit it to drop down upon the table. Air is admitted to the vacuum chamber at this time, through a valve 260 which normally closes an opening in the end wall of the slide 248, but as the slide reaches the limit of its advancing movement the stem of the valve strikes against the end wall of the guideway in the bar 256 and thus causes the valve to open against the tension of a valve spring 262 coiled about the rear portion of the valve stem. As the slide again moves into position to remove the next wound tube from its drum, the stem of the valve 260 disengages from the end wall of the guideway so as to permit the valve to close and thus permit the air to be exhausted from the vacuum chamber of the slide. The slide is thus reciprocated by means of a link 264 (Fig. 7) having one end pivotally connected with a stud secured to the slide 248 and extended through a clearance slot in the bar 256, and having its other end connected with the upper end of an arm 266 which has its lower end secured on a rockshaft 268. The rock-shaft is actuated by means of an arm 270 secured thereto and connected by a link 272 with a crank 274 on the end of the cam shaft 94.

The swinging guideway bar 256 is actuated by means of an arm 276 (Figs. 3, 7 and 31) having one end secured to a rock-shaft 278 and its other end bifurcated and engaging a stud 280 secured on a lug depending from the free end of the swinging bar. The rock shaft is actuated by means of an arm 282 secured on its outer end which is connected with one end of a rod 284 that is actuated by a cam 286 on the cam shaft 94.

Figures 29, 30:
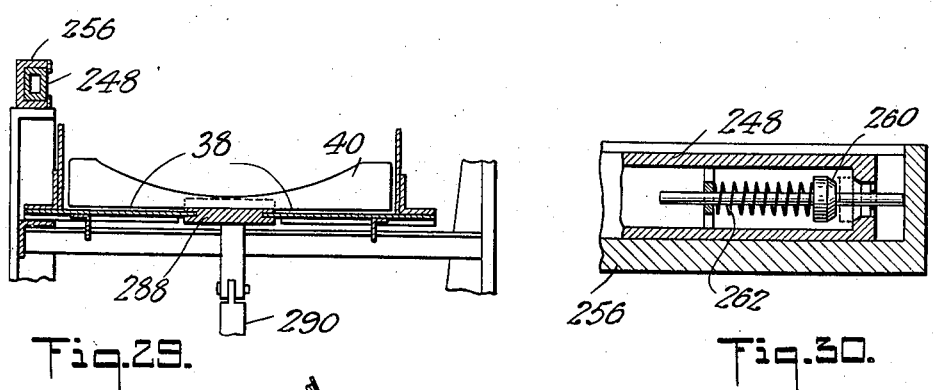
Fig. 29 is a sectional view, on an enlarged scale, taken on the line 29—29 of Fig. 3.
Fig. 30 is a sectional view, on an enlarged scale, taken on the line 30—30 of Fig. 8, but showing a portion of the tube removing mechanism in advanced position.
Figure 31:
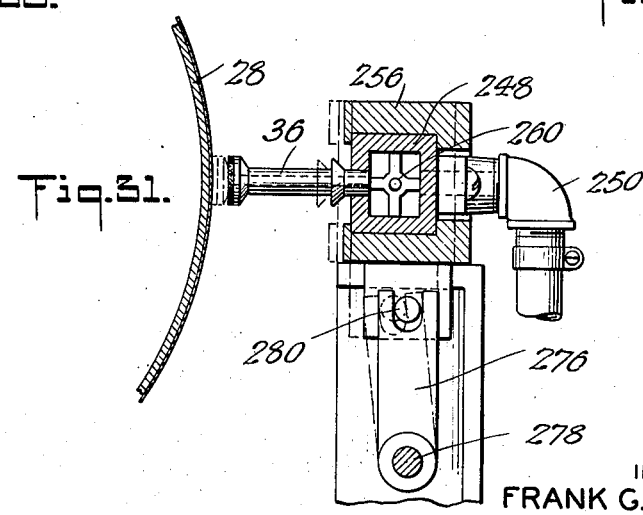
Fig. 31 is a detail sectional view taken on the line 31—31 of Fig. 8.

The pusher head 40 (Figs. 3, 7 and 29) for pushing the wound bag beneath the inclined plate 42 to the flattening and feeding rolls 44, is secured on a slide 288 which is suitably mounted to slide in a slot in the table 38. The pusher head is actuated, in suitable timed relation to the tube removing mechanism, by means of an arm 290 having its upper end connected with a depending lug on the slide 288 and its lower end pivotally mounted on a bracket on the machine frame. The arm 290 is operatively connected through a link 292 with an arm 294 secured on the rock shaft 268.

The machine is driven from a main drive shaft 296 (Figs. 2 and 3) which is driven from an electric motor 298 through a sprocket chain 300 which passes over sprocket wheels on the motor shaft and the drive shaft. The drive shaft 296 carries a pinion 302 which operatively engages a gear 304 which is secured on a shaft with a pinion 306 that engages a gear 308 secured on a shaft 310. This shaft 310 carries a pinion 312 which engages the large gear 172 secured on the cam shaft 94. On the inner end of the shaft 310 is secured a pinion 311 which drives a pinion 313 (Fig. 3) secured on the sprocket wheel shaft 106 that drives the endless conveyor 20 as above described. A bevel gear 314 on the end of the sprocket shaft 106 operatively engages a bevel gear 316 secured on a shaft 318 that extends longitudinally adjacent one of the side frames of the machine. This shaft 318 carries a bevel gear 320 which engages a bevel gear 322 mounted on a short shaft that carries a pinion 324 which meshes with a gear 326 secured on the shaft 132 that carries the cams 134 and 242. The driving connection between the shaft 318 and the glue-applying roll 114, comprises a bevel pinion 328 secured on said shaft which engages a bevel pinion 330 secured on a short shaft that carries a sprocket wheel which is in driving connection with a sprocket wheel on the shaft of the glue roll 114 through a sprocket chain 332. The upper glue roll 112 is driven by a sprocket chain 334 which passes over sprocket wheels on the shafts of the two rolls. The shaft 318 also carries a bevel pinion 336 which engages a bevel pinion 338 secured on one end of the shaft 46 for the lower cutting disks 16. The shaft of the upper cutting disks 16 is driven through spur gears 340 secured on the upper and lower shafts 46. The lower feed roll 14 is driven through a bevel pinion 342, secured on the shaft 318, which engages a bevel pinion on a shaft 344 that carries the lower feed roll 14. The upper feed roll 14 is driven in unison with the lower feed roll through spur gears 346 secured on the ends of the shafts of the lower and upper feed rolls.

The tube flattening and feeding rolls 44 are driven from the drive shaft 296 of the machine through mechanism including gears 339, 341 and 343 and a shaft 345 which is in alinement with and connected to the drive shaft 296 through a clutch 347.

In place of the pins 50 for retaining the pieces that are cut from the webs in forming the notches on the male dies 48 until they are removed through the suction nozzles 52 leading into the suction pipe 54, there is illustrated in Figs. 24 to 28 suction means for accomplishing this result. As shown, each of the male dies is provided with a small orifice 348 which is in communication, through a radially extending orifice 350 in the cutting disk that carries the cutting die, with an axial bore or orifice 352 in the shaft 46 that carries the upper cutting disks. This orifice 352 leads through a suitable swivel connection 354 to a pipe 356 leading from a suitable suction fan or other vacuum creating means. The pipe 356 is provided with a sliding valve 358 which is adapted to be opened and closed by means of a cam 360 secured on the longitudinally extending shaft 318. The connection between the valve 358 and the cam 360 comprises a link 362 connecting the lower end of the valve with one end of a lever 364 which has its other end provided with a cam roll for engagement with the cam 360, the cam roll being held in engagement with the cam by means of a coiled spring 366 connected with the outer end of the cam lever. With this construction, when the cutting dies cut the pieces from the webs to form the notches in the longitudinal edges thereof, the valve 35 is opened so as to cause the waste pieces to be held on the male cutting dies by suction until these dies are carried into position adjacent the nozzles 52, whereupon the valve 358 is closed so as to permit the pieces to be drawn through the nozzles 52 and discharged from the machine through the pipe 54.

From the foregoing it will be apparent that my improved machine as illustrated in the drawings is capable of operating in accordance with my improved method, uniformly and expeditiously in cutting off from the continuously fed strip the webs from which the bag tubes are formed; cutting notches in the longitudinal edges of the webs in properly spaced relation; applying glue to one side of the webs in the desired locations; successively presenting the webs to the winding drums which are alternately moved into position to receive them; causing the webs thus presented to the winding drums to be wound tightly and smoothly so as to insure intimate contact of the materials of the several windings or plies of the wound tubes and proper gluing thereof; removing the wound tubes from the winding drums; and discharging the tubes from the machine in uniformly flattened condition with the notches in the ends of one side of the tubes accurately centered, the tubes when discharged from the machine being ready to be operated upon by the usual heading or ending machines.

As will be evident to those skilled in the art, my invention permits various modifications without departing from the spirit thereof or the scope of the appended claims.

What I claim is:

1. A machine for use in the manufacture of bag tubes having, in combination, means for feeding a strip longitudinally, means for applying adhesive to one end of the strip, means for winding the strip upon itself a plurality of times so as to form a tube with the outer end of the strip secured by said adhesive, means for removing the tube from said winding means, and means for flattening the tube when removed from said winding means.

2. A machine for use in the manufacture of bag tubes having, in combination, means for winding a strip upon itself a plurality of times to form a tube, comprising a drum upon which the strip is wound and capable of being contracted and expanded peripherally, means for maintaining the drum in expanded condition during the winding operation, means for contracting the drum after the completion of the winding operation to permit the tube to be removed, and means for removing the tube from the contracted drum and flattening it.

3. A machine for use in the manufacture of bag tubes having, in combination, means for winding a strip upon itself a plurality of times to form a tube, comprising a drum upon which the strip is wound and capable of being contracted and expanded peripherally, means for maintaining the drum in expanded condition during the winding operation, means for contracting the drum after the completion of the winding operation, means for removing the tube from the drum when the drum is in contracted condition, and means for flattening the tube after it has been removed from said drum.

4. A machine for use in the manufacture of bag tubes having, in combination, means for winding a strip upon itself a plurality of times to form a cylindrical tube comprising a rotating mandrel, means for presenting one end of the strip to a definite position on the mandrel, and means for causing said end of the strip to be secured to the mandrel to cause the strip to be wound thereon during the continued rotation thereof, and means acting automatically after the completion of the winding operation for removing the tube from the mandrel in a substantially predetermined angular position, said mandrel rotating continuously during the performance of all of said operations.

5. A machine for use in the manufacture of bag tubes having, in combination, a plurality of rotating mandrels adapted to be successively moved into a definite position, means for feeding a plurality of strips to present their advancing ends to said mandrels, respectively, when the mandrels reach said definite position, means for securing the advancing end of each strip to the mandrel to which it is presented so as to cause the strip to be wound on the mandrel, and means for removing each tube from its mandrel and for flattening the tube.

6. A machine for use in the manufacture of bag tubes having, in combination, a rotatable carrier, a plurality of mandrels carried by the carrier, means for rotating the carrier intermittently to successively move the mandrels into a definite position and to retain each mandrel in said position for a predetermined interval of time, means for rotating each mandrel when it is in said position, means for presenting a strip to each mandrel when in said position to cause the strip to be wound on the mandrel, and means for removing the wound strip from its mandrel and flattening it.

7. A machine for use in the manufacture of bag tubes having, in combination, means for feeding a strip longitudinally, means for cutting off predetermined lengths from the strip as it is being fed, means for successively winding each length upon itself to form a tube as the advancing end of the strip reaches a predetermined position, and means for removing the wound strip from said winding means and flattening it.

8. A machine for use in the manufacture of bag tubes having, in combination, means for feeding a strip longitudinally, means for forming equally spaced notches in the strip adjacent one of its longitudinal edges as it is being fed, and means for winding the strip upon itself a plurality of times to form a tube with said notches registering and arranged at one side of the axis of the tube.

9. A machine for use in the manufacture of bag tubes having, in combination, means for feeding a strip longitudinally, means for forming equally spaced notches in the strip adjacent one of its longitudinal edges as it is being fed, means for winding the strip upon itself a plurality of times to form a tube with said notches registering and arranged at one side of the axis of the tube, and means for flattening the tube in such a manner as to centrally position said notches.

10. A machine for use in the manufacture of bag tubes having, in combination, means for feeding a strip longitudinally, rotating cutting members for cutting pieces from the strip to form equally spaced notches adjacent one of its longitudinal edges, suction means for retaining each piece on one of the cutting members for a predetermined number of degrees of rotation of the member, and means for then removing the piece from said cutting member.

11. A machine for use in the manufacture of bag tubes having, in combination, means for feeding a strip longitudinally, means for cutting off predetermined lengths of the strip as it is being fed, means for applying adhesive to one side of each length of the strip along its longitudinal edges and across one end, and means for winding each length upon itself a plurality of times to form a tube with the windings or plies thereof secured together by said adhesive.

12. A machine for use in the manufacture of bag tubes having, in combination, means for feeding a strip longitudinally, means for applying adhesive to one side of the strip along its longitudinal edges and across its rear end, and means for winding the strip upon itself a plurality of times to form a tube with the several windings secured together by said adhesive.

13. A machine for use in the manufacture of bag tubes having, in combination, means for applying adhesive to one side of a strip adjacent its longitudinal edges and across its rear end comprising an endless conveyor, means for applying adhesive to the outer side of the conveyor, means for delivering one end of the strip to the conveyor whereby said end is carried by the conveyor a predetermined distance and the remaining portion of the strip is carried by the conveyor a corresponding distance, the strip being of substantially the same length as the conveyor, means for stripping the strip from the conveyor at one extremity of said predetermined distance of travel, and means for winding the strip upon itself as it leaves the conveyor.

14. A machine for use in the manufacture of bag tubes having, in combination, an endless conveyor, means for applying adhesive to the outer side of the conveyor, means for delivering one end of a strip upon the rear end of one of the stretches of the conveyor whereby it is carried the length of said stretch, means for stripping the strip from the conveyor as it reaches the forward end of said stretch, and means for winding the strip upon itself to form a tube with the windings secured together by said adhesive.

15. A machine for use in the manufacture of bag tubes having, in combination, an endless conveyor, means for applying adhesive to the outer side of the conveyor, means for delivering one end of a strip upon the rear end of one of the stretches of the conveyor whereby it is carried the length of said stretch, a rotating brush for smoothing the strip on the conveyor as it passes to the conveyor, means for stripping the strip from the conveyor as it reaches the forward end of said stretch, and means for winding the strip upon itself to form a tube with the windings secured by said adhesive.

16. A machine for use in the manufacture of bag tubes having, in combination, a winding mandrel for winding a strip upon itself a plurality of times, means for feeding a strip longitudinally to present it to the winding mandrel, and a device interposed between said feeding means and said mandrel for tensioning the strip as it is wound on the mandrel, said device being rendered effective after the start of the winding operation.

17. A machine for use in the manufacture of bag tubes having, in combination, a plurality of mandrels, means for successively moving the mandrels toward and from a definite position, means for feeding a strip longitudinally, means for cutting off predetermined lengths of the strip as it is being fed, means for successively presenting said strip lengths to said mandrels, respectively, when said mandrels are in said definite position, means for securing the advancing end of each strip length on its mandrel whereby the length is wound on the mandrel during the continued rotation thereof, and means for removing the wound strip from its mandrel and flattening it.

18. A machine for use in the manufacture of bag tubes having, in combination, means for winding a strip upon itself to form a tube comprising a rotating mandrel on which the strip is wound, and means for removing the tube from the mandrel at the completion of the winding operation comprising a plurality of suction nozzles, means for moving the nozzles into holding engagement with the tube when the tube is in a predetermined angular position, and for moving the nozzles when they are thus engaged with the tube lengthwise of the mandrel to remove the tube from the mandrel.

19. A machine for use in the manufacture of bag tubes having, in combination, a winding drum for winding a strip upon itself a plurality of times divided longitudinally into a plurality of sections, links for supporting said sections, springs tending to shift said sections longitudinally about the pivots of said links to maintain the drum sections in expanded condition, a stop for limiting the shifting movement of said sections, and means acting automatically to shift said sections in the opposite direction when the strip has been completely wound on the drum to reduce the peripheral length of the drum to permit the wound strip to be removed.

20. A machine for use in the manufacture of bag tubes having, in combination, a rotating drum for winding a strip upon itself a plurality of times to form a tube, and means acting automatically when the tube has been completely wound and is in a predetermined angular position for stopping the rotation of the tube and removing it from the drum, and means for flattening the tube while it is in said predetermined angular position.

21. A machine for use in the manufacture of bag tubes having, in combination, means for winding a strip having equally spaced notches in its longitudinal edges upon itself a plurality of times to form a tube with the notches in each longitudinal edge of the strip registering at one side of the axis of the tube, and means for flattening the tube with the notches at the ends of the tube centrally positioned.

22. A machine for use in the manufacture of bag tubes having, in combination, a winding drum for winding a strip upon itself to form a tube, means for sliding the tube when wound off of the drum, a table for receiving the tube when removed from the drum, means for moving the tube along the table, and devices for flattening the tube as it is thus moved.

23. The method of forming a bag tube which comprises feeding a strip longitudinally, cutting notches in its longitudinal edges as it is being fed, and winding the strip upon itself a plurality of times to form a bag tube with the notches in each longitudinal edge of the strip registering at one side of the axis of the tube.

24. The method of forming a bag tube which comprises feeding a strip longitudinally, cutting notches in its longitudinal edges as it is being fed, winding the strip upon itself a plurality of times to form a bag tube with the notches in each longitudinal edge of the strip registering at one side of the axis of the tube, and then flattening the tube in such a manner as to centrally position said notches at the ends of the tube.

25. A machine for use in the manufacture of bag tubes having, in combination, means for winding a strip upon itself a plurality of times to form a tube, and means acting automatically after the completion of the winding operation for removing the tube from said winding means while the tube is held in a predetermined angular position.

26. A machine for use in the manufacture of bag tubes having, in combination, means for winding a strip upon itself a plurality of times to form a tube, and means acting automatically after the completion of the winding operation for removing the tube from said winding means while the tube is held in a predetermined angular position, and for flattening the tube while the tube is held in said position.

27. A machine for use in the manufacture of bag tubes having, in combination, means for winding a strip upon itself a plurality of times to form a tube comprising a rotating mandrel upon which the tube is wound, and means acting automatically after the completion of the winding operation for stopping the rotation of the tube in a predetermined angular position and for removing the tube from said mandrel during the continued rotation of the mandrel.

28. A machine for use in the manufacture of bag tubes having, in combination, means for winding a strip upon itself a plurality of times to form a tube comprising a collapsible mandrel upon which the strip is wound, means for collapsing the mandrel after the completion of the winding operation, and means for stopping the rotation of the tube while it is in a predetermined angular position and after the mandrel has been collapsed, and for removing the tube from said mandrel.

29. A machine for use in the manufacture of bag tubes having, in combination, a rotatable carrier, a plurality of mandrels carried by the carrier, means for rotating the carrier intermittently to successively move the mandrels into a definite position and to retain each mandrel in said position for a predetermined interval of time, means for rotating the mandrel continuously during the operation of the machine, means for presenting a strip to each mandrel when in said position to cause the strip to be wound on the mandrel, and means acting automatically after each tube is wound to stop the rotation of the tube with relation to the mandrel and then to remove the tube from the mandrel.

30. A machine for use in the manufacture of bag tubes having, in combination, means for winding a strip upon itself to form a tube, comprising a rotating mandrel on which the strip is wound, and means acting automatically at the completion of the winding of the tube to engage the tube when it is in a predetermined angular position and while holding it in said position removing the tube from the mandrel during the continued rotation of the mandrel.

31. A machine for use in the manufacture of bag tubes having, in combination, means for winding a strip upon itself a plurality of times comprising a mandrel upon which the strip is wound, said mandrel being capable of being contracted and expanded, means for presenting one end of the strip to a definite position on the mandrel while the mandrel is in expanded condition, suction means for causing said end of the strip to be secured to the mandrel during the continued rotation thereof, means for rendering the suction means ineffective at the completion of the winding operation, and means operating in timed relation to the last mentioned means for contracting the mandrel so as to permit the wound tube to be removed.

32. A machine for use in the manufacture of bag tubes having, in combination, means for feeding a strip longitudinally, means for applying adhesive to one side of the strip as it is being fed upon lines arranged in predetermined positions, means for winding the strip upon itself a plurality of times to form a tube with the convolutions thereof secured together by said adhesive, means for removing the tube from said winding means at the completion of the winding operation, and means for flattening the tube when removed from said winding means.

33. A machine for use in the manufacture of bag tubes having, in combination, a continuously rotating mandrel capable of being contracted and expanded, means for presenting one end of a strip to the mandrel, means for causing said end of the strip to be secured to the mandrel to effect winding of the strip on the mandrel during the rotation of the latter to form a bag tube, means acting automatically after the completion of the winding of the bag tube to contract the mandrel and to release said end of the strip, and means acting automatically therewith to stop the rotation of the bag tube with relation to the mandrel and then to remove the tube from the mandrel.

34. A machine for use in the manufacture of bag tubes, in combination, means for feeding a strip longitudinally, means for applying adhesive to predetermined areas of the strip, means for cutting off lengths of the strip at predetermined locations with reference to the areas having the adhesive applied thereto, means for successively winding the strip lengths to form tubes and means for flattening each of the wound tubes to bring the areas having the adhesive thereon into predetermined relation with the sides of the flattened tube.

FRANK G. WIKSTROM.